Sept. 12, 1967  R. C. TALBOT  3,340,824
SANDWICHING MACHINES
Filed Aug. 23, 1965  2 Sheets-Sheet 2
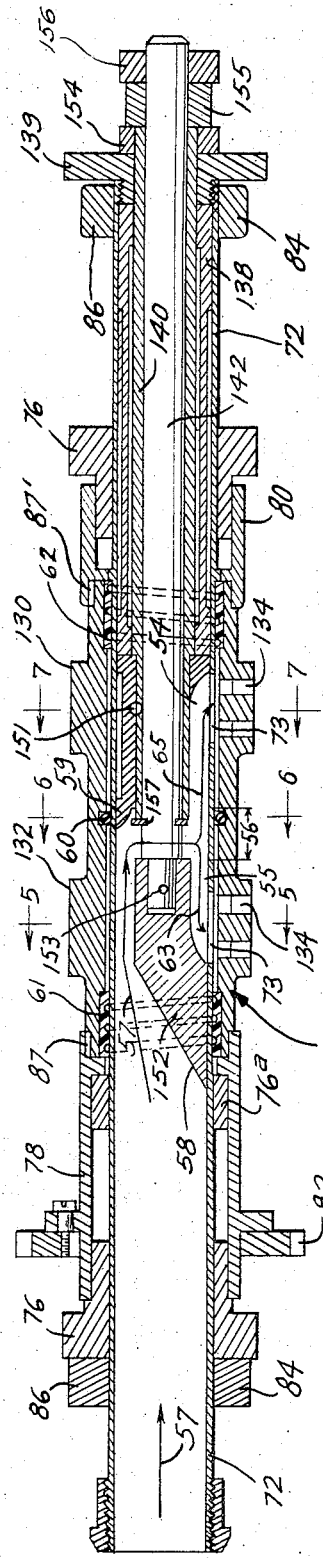
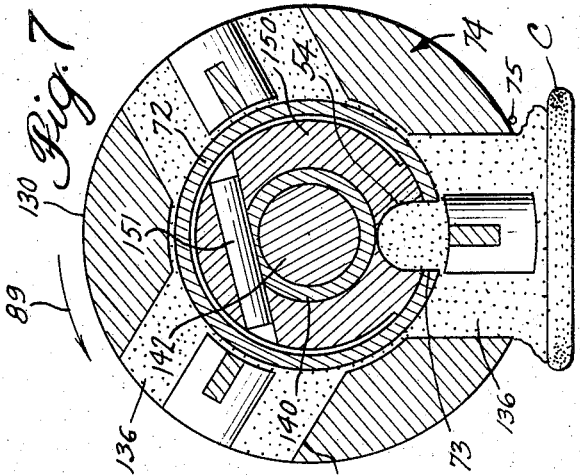
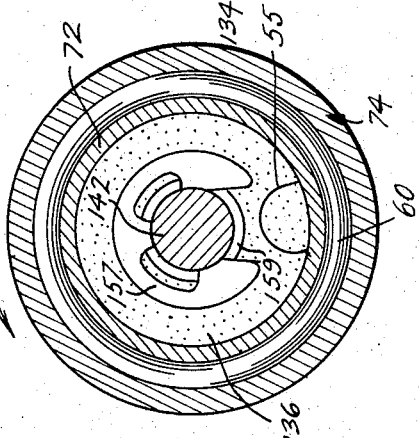
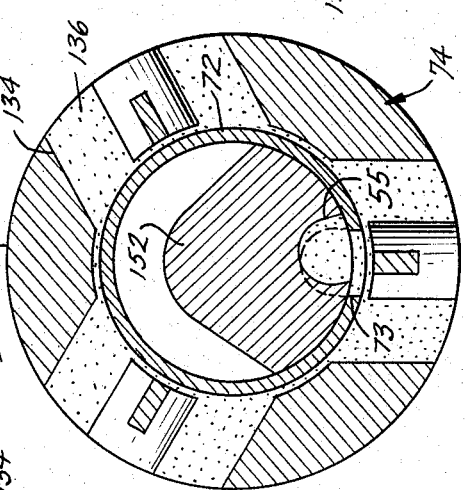
INVENTOR
RICHARD C. TALBOT.
BY
Bair, Freeman & Molinare
ATTORNEYS United States Patent Office 3,340,824
Patented Sept. 12, 1967

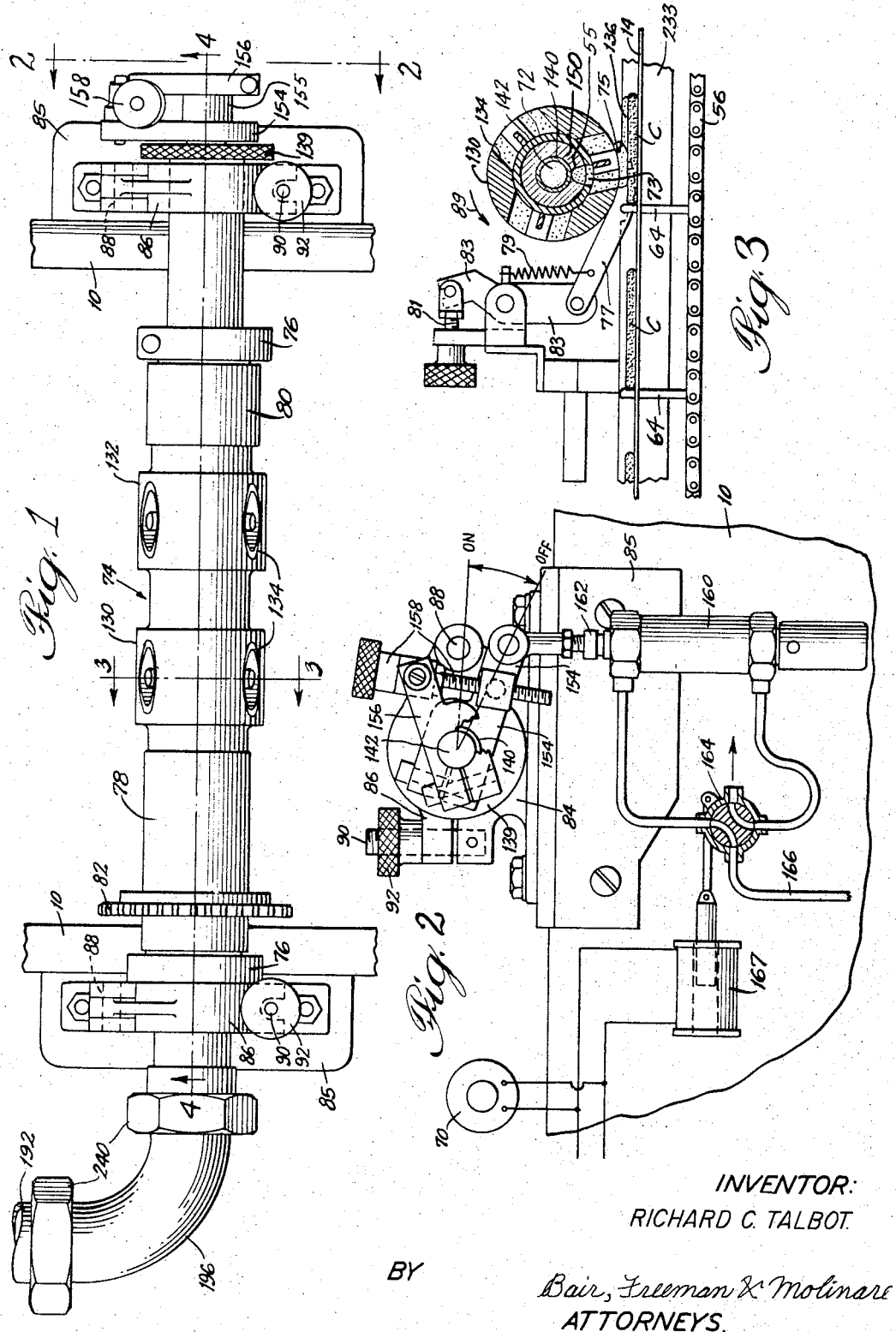

3,340,824
SANDWICHING MACHINES
Richard C. Talbot, Skokie, Ill., assignor to Peters Machinery Company, Chicago, Ill., a corporation of Illinois
Filed Aug. 23, 1965, Ser. No. 481,611
6 Claims. (Cl. 107—1)

This invention relates to improvements for sandwiching machines of the type shown in Fay Patent No. 2,993,453.

The machine of the Fay patent is designed for assembling those types of "sandwiches" which comprise two cookies with a filler of creme between them, the machine having a conveyor for feeding cookies to a creme depositor which deposits a layer of creme thereon, whereupon another cookie is deposited on top of the layer of creme and the sandwiches thus assembled are delivered from the machine.

General objects of my present invention are to provide improvements in a valving arrangement for a depositor drum of the sandwiching machine which more evenly distributes the sandwiching creme to a plurality of depositor stencils, and to provide the depositor drum with a novel means to prevent the creme working out into the bearings at the ends of the depositor drum.

More specifically, it is one object of my present invention to provide a valve insert for a depositor drum and delivery tube of a sandwiching machine of the type shown in the Fay patent which has a valve arrangement that causes the creme coming into one end of the delivery tube to be substantially evenly distributed between the two sepaarte valves of the valve assembly and thereby to the two depositing stencils of the drum.

Another object is to provide a depositor stencil assembly so constructed that it can be readily taken apart for cleaning, and has automatic shut-off means incorporated therein so that the discharge openings thereof may be closed whenever the machine stops to avoid undesirable seepage of creme from the depositor, the stencils and valves therefor being so constructed as to be adjustable as to discharge opening size so that the flow of creme is properly balanced between a pair of stencil openings. This type of depositor has a drum and cut-off wire arrangement for depositing sandwich creme or related material on base cookies of any desired configuration at high speeds and without the use of pistons, the high speed feature being attained because there is no intermittent or reciprocating motion in the apparatus and all elements thereof rotate at a constant rate of speed.

A further object is to provide a depositor comprising a stationary sleeve around which a drum is rotatable and a proportioning valve arrangement to equalize the flow of creme of the stencil openings when there is more than a single row of sandwiches being formed in the machine, the parts being so designed that they permit the forming of sandwiches at a relatively high rate such as 600 to 1000 per minute in a double row machine without undue breakage of the sandwiches.

Still a further object is to provide for slightly more flow of creme to one of the stencil openings than to the other whereby the valve for one stencil may be wide open whereas the valve for the other one may be partially closed to a variable extent for securing a proper balance as between the flow of creme from the two stencil openings of the depositor drum.

An additional object is to provide a simple means interposed between the depositor drum and the creme delivery tube to prevent undesirable movement of the creme beyond the ends of the depositor drum and into the bearings surrounding the creme delivery tube comprising internal threads which are left-hand in one end of the depositor drum and right-hand in the other end so that the rotation of the drum relative to the delivery tube has a tendency to feed any creme that gets into the threads toward the center of the drum and thereby toward the valves within the delivery tube.

With these and other objects in view, my invention consists in the construction, arrangement and combination of the various elements disclosed, whereby the objects above contemplated are attained, as hereinafter more fully set forth, pointed out in my claims and illustrated in detail on the accompanying drawings, wherein:

FIG. 1 is a plan view of a depositor drum embodying my invention and shows pillow blocks for mounting the depositor drum on the machine;

FIG. 2 is an end elevation of FIG. 1 according to the line 2—2 thereof;

FIG. 3 is a vertical sectional view on the line 3—3 of FIG. 1 and shows adjacent parts of the sandwiching machine;

FIG. 4 is a slightly enlarged vertical sectional view on the line 4—4 of FIG. 1 showing details of construction of the depositor drum, the creme delivery tube and the valve assembly within the delivery tube;

FIGS. 5, 6 and 7 are enlarged vertical sectional views on the lines 5—5, 6—6 and 7—7, respectively, of FIG. 4, and FIG. 8 is a bottom plan view of a portion of FIG. 4.

On the accompanying drawings I have used the reference numeral 10 to indicate side frame of the sandwiching machine on which brackets 85 are mounted as shown in FIGS. 1 and 2 to support pillow blocks 84 and pillow block caps 86. The pillow blocks 84 and the caps 86 are designed to removably support a depositor drum 74 and a delivery tube 72, together with associated parts as will hereinafter appear. The creme delivery tube 72 is removably supported in the pillow blocks 84, the pillow block caps 86 being pivoted at 88 to the pillow blocks as shown in FIG. 2, and clamp bolts 90 are provided with clamp nuts 92 for clamping the pillow block caps against the top of the tube 72 to hold it firmly seated in, and against rotation relative to, the pillow blocks 84.

The depositor assembly includes the delivery tube 72 which has a pair of stencil ports 73 around which the depositor drum 74 rotates. The tube 72 is provided with bearings 76 and the depositor drum 74 is provided with extension sleeves 78 and 80 keyed thereto at 87 and 87' (FIG. 4) and rotatable with the bearings 76 on the tube 72. Adjacent the left end of the depositor drum 74 the extension sleeve 78 is provided with a bearing 76ª also rotatable on the tube 72. The extension sleeve 78 is provided with a drive sprocket 82 driven by mechanism not shown but which is fully described in the Fay patent.

The depositor drum 74 further includes a pair of drum-like lands 130 and 132 in each of which is a stencil opening 134 of any desired shape, three of them being provided around the periphery of each land, and the timing is such that the depositor rotates one revolution for each three base cookies passing thereunder. The base cookies are shown at C in FIG. 3 for the deposit of creme 136 thereon as will be more fully explained hereinafter.

As shown in FIG. 1, a suitable conduit 192 receives creme under pressure as described in the Fay patent and delivers it through an elbow 196 to the creme delivery tube 72, coupling nuts 240 serving as connecting means for the elbow to the conduit and the delivery tube.

Referring to FIG. 4 a sleeve 138 extends into the right-hand end of the tube 72 and is retained therein by a plug 139 screwed into the tube. A shut-off valve tube 140 is rotatable therein and a shut-off valve rod 142 is rotatable in the valve tube 140. The tube 140 has a valve block 150 secured thereto as by a pin 151 shown in FIGS. 4 and 7. A second valve block 152 is pinned at 153 to the valve rod 142 as shown in FIG. 4. These valve blocks are adjustable in relation to each other by means of levers 154 and 156 (FIG. 2) secured to the tube 140 and the rod 142, respectively, and the levers are angularly adjustable relative to each other by means of an adjusting screw 158. The lever 156 and a collar 155 limit the left-hand axial movement of the rod 142 relative to the tube 140 and at the left hand end of the tube a key 157 shown in FIGS. 4 and 6 is received in a groove 159 of the rod to limit the motion in the opposite direction.

Both valve blocks are also simultaneously adjustable to and from a cut-off position by the operation of a double acting pneumatic cylinder 160 from which a piston rod 162 projects, the rod being pivoted to the lever 154. Shown diagrammatically in FIG. 2 is a control valve 164 for the cylinder supplied from a compressed air line 166 and actuated by a solenoid 167 shunting the circuit of a motor 70 which drives the sandwiching machine so that whenever the motor is de-energized as illustrated the valve blocks 152 and 150 will move to the shut-off position, identified "OFF," and will move to the open "ON" position when the motor 70 and the solenoid 169 are energized.

Referring to FIG. 3 a cut-off wire 75 is disclosed supported by arms 77 and held against the periphery of the lands 130 and 132 of the depositor drum 74 by springs 79. The arms 77 are supported on arms 83 pivoted to a stationary bracket and provided with an adjusting screw 81 to determine the position of the wire 75 relative to the stencil opening 134. Such relation is shown in FIG. 7.

The valve block 150 as shown in FIGS. 4 and 7 has a port groove 54 whereas the valve block 152 has a similar port groove 55 which cooperate with the stencil ports 73 in the creme delivery tube 72. The port groove 54 terminates at the left-hand end of the valve block 150 as shown in FIG. 4 whereas the port groove 55 terminates at the right-hand end of the valve block 152. These ends are spaced from each other as indicated by dimension 56 in FIG. 4 and the gap thus provided serves to receive creme from the tube 72 which is traveling from the left-hand end thereof toward the right-hand end as indicated by arrows 57.

If the lengths of the port grooves 54 and 55 are made equal, theoretically there would be equal flow of creme to the stencil openings 134 in both lands 130 and 132. In actual practice, however, when two lines of sandwiches are being formed in the machine there will be a slight imbalance as between the creme deposits on the two lines of cookies and accordingly a relative adjustment of the valve ports of the two valve blocks is necessary. Accordingly, I provide the length of one port groove greater than the other so that there will be more flow through such other port groove and the one port groove can be left wide open. The other one may then be adjusted to a partly closed position until the desired balance of flow is had. As illustrated, the groove 54 is longer than the groove 55 to accomplish this result and the valve block 152 having the groove 55 is shown partially closed in FIG. 5 as compared to the groove 54 wide open in FIG. 7. The operator may run a few sandwiches and observe the deposit of creme on the two lines thereof and adjust the valve block 152 relative to the valve block 150 by rotation of the adjusting screw 158 in the proper direction.

The valve block 152 is provided with a substantially flat deflecting surface 58 as shown in FIG. 4 to deflect the creme to flow over the top of the valve block before entering the space indicated by the dimension 56 and the valve block 150 is provided with a semi-circular cone-shaped deflector 59 to direct the creme into this space 56. Between the lands 130 and 132 I provide an O-ring seal 60 to keep the creme from one valve block from leaking across to the opposite stencil opening. This is particularly desirable when only one valve block is in operation whereas the other one is closed off as when depositing creme on a single row of cookies.

It is also desirable to have a substantially friction-free means to prevent the creme from the valve blocks leaking through the stencil ports 73 of the tube 72 and then along the outside of the tube and out of the ends of the depositor drum 74 and into the extension sleeves 78 and 80. I provide for this in the form of internally threaded sleeves 61 and 62 formed of nylon or the like, one being threaded left-hand and the other right-hand. In FIG. 4 the sleeve 61 is threaded left-hand and the sleeve 62 is threaded right-hand whereas the direction of rotation of the depositor drum 74 is top-toward-the-observer (also see arrows 89 in FIGS. 3, 5, 6 and 7) so that the tendency for creme to flow into the threads is counteracted by the direction of threading which tends to move the creme toward the center of the drum. This arrangement eliminates the necessity of packing glands or O-rings for the ends of the depositor drum and eliminates the frictional drag introduced by seal means of the character mentioned.

PRACTICAL OPERATION

When the sandwiching machine is in operation, the creme 136 (FIGS. 3 and 7) fed under pressure to the creme delivery tube 72 flows past the valve block 150 and into the space indicated by the dimension 56 where it divides substantially equally and passes as indicated by the arrows 63 and 65 to the stencil openings 134 in the respective lands 132 and 130. The valve blocks 150 and 152, of course, are now each in open position as shown in FIGS. 5 and 7 by reason of the motor 70 of the sandwiching machine being energized and the solenoid 168 likewise energized so that the valve blocks have been moved from "OFF" to "ON." An arrangement of this type is provided so that when the machine stops the valves are automatically moved to the closed position as an open stencil port 73 would permit undesirable leakage of creme if the valve were not closed.

Since the land 130 is farther from the space indicated by dimension 56 than the land 132, in order to equalize the flow of creme 136, the valve block 152 should be adjusted to a partially closed position as shown in FIG. 5 while the valve block 152 is in the full-open position shown in FIG. 7. Referring to FIG. 2, by adjusting the screws 158 so that the valve block 152 as shown in FIG. 5 is at the solid line position rather than the dotted line (wide open) position, there is less total width of port opening when compared with the width in FIG. 7. Thus, by manipulating the adjusting screw 158 a very nice balance of creme flow from the two stencil lands 130 and 132 is possible. The proportioning valve adjustment just described can also be accomplished while the machine is in operation.

As the depositer drum 74 rotates counterclockwise in FIGS. 3 and 7, the cut-off wire 75 cuts off the creme for each stencil as it passes the wire thus leaving a clearly defined deposit of creme 136 on the base cookie C. The base cookies and their deposits of creme are then propelled by the fingers 64 shown in FIG. 3 along wires 14 as described in the Fay patent to a position where topping cookies are deposited on the creme deposits and the completed sandwiches are then discharged from the machine.

In a sandwiching machine of the type shown in the Fay patent and in other prior types of machines, creme valves wherein the creme first comes to one valve and then flows on to the next present the problem of the creme tending to flow through the first valve at a greater rate than through the second valve and hence the valve openings of the first valve must be reduced to a cracked-open position so that substantially the same size deposit of creme is discharged through both stencils. Because of this arangement, i.e., the cracked-open adjustment of the first valve, the creme will be squirting through it while it will be discharging more slowly through the second valve. Fine adjustment is necessary to get relatively uniform flow through both valves, but the balance is disturbed any time there is a variation in creme pressure and/or speed of operation of the machine. The valves must then be rebalanced. Also, because of the necessity of closing the first valve to a cracked-open position, the machine cannot handle cremes containing solids such as coconut chips or shreds, or peanut particles and other solids which clog or plug the cracked opening of the first valve and cause the necessity for shut-down and cleaning of the creme system.

With my valve arrangement I get better and more uniform control of the creme discharged through both valves—hence better and more uniform creme distribution on the cookies due to larger opening possible for the first valve. It is also possible to readily use cremes containing solids such as peanut chunks, coconut, etc.

The clamp type pillow blocks 84, 86 provide for ready removal of the entire depositor drum assembly for cleaning purposes. The pillow blocks can also be quickly opened for removing the depositor assembly for replacement by a different drum such as one having a modified form of stencil opening compared to that shown in FIG. 8 at 134 (or one of different size) and/or for connecting a fresh supply of creme to the machine to replace one that has been depleted thus minimizing the down time for the machine and securing maximum sandwich production. Also the design is such that the inner assembly within the drum 74 can be reversed end-for-end in case the creme pump assembly has more room for its location on the right side of the machine than on the left side.

Some changes may be made in the construction and arrangement of the parts of my valving arrangement for sandwiching machine without departing from the real spirit and purpose of my invention, and it is my intention to cover by my claims any modified forms of structure or use of mechanical equivalents which may reasonably be included within their scope.

I claim as my invention:

1. In an improvement for sandwiching machines, the combination with a creme delivery tube and a stencil tube rotatable thereon and having a pair of stencils receiving creme from said creme delivery tube; of valve means for said stencils comprising a valve insert in said creme delivery tube for each stencil and each having a discharge port for alignment with a port in the delivery tube during creme depositing operations, and means for directing creme entering one end of said creme delivery tube to a space substantially midway between said discharge ports and then toward said discharge ports.

2. An improvement for sandwiching machines according to claim 1 wherein said means for directing creme includes a deflecting portion on the valve insert closest to said one end of said creme delivery tube to deflect all the creme to said space substantially midway between said discharge ports.

3. An improvement for sandwiching machines according to claim 2 wherein said valve inserts are spaced apart to provide said space substantially midway between said discharge ports.

4. An improvement for sandwiching machines according to claim 1 wherein said valves are relatively adjustable as to effective size of the opening at said discharge ports and creme delivery tube ports.

5. An improvement for sandwiching machines according to claim 1 wherein bearings are provided for said stencil tube and surround said creme delivery tube, said bearings being axially located on opposite sides of said stencils, and means is provided to prevent creme from the outer surface of said creme delivery tube from entering said bearings comprising internal threads in said stencil tube between each stencil and its adjacent bearing, one thread being left-hand and the other right-hand to feed creme back toward said space substantially midway between said discharge ports.

6. An improvement for sandwiching machines according to claim 5 wherein an O-ring seal is provided between said creme delivery tube and said stencil tube, and is axially located between said stencils.

References Cited
UNITED STATES PATENTS

| | | | |
|---|---|---|---|
| 2,846,960 | 8/1958 | Govatsos | 107—1 |
| 2,993,453 | 7/1961 | Fay | 107—1 |
| 3,276,397 | 10/1966 | Poppe et al. | 107—14 |

WILLIAM I. PRICE, *Primary Examiner.*

J. SHEA, *Assistant Examiner.*